(12) United States Patent
Mishima et al.

(10) Patent No.: US 11,374,891 B2
(45) Date of Patent: Jun. 28, 2022

(54) CONTROL APPARATUS, CONTROL SYSTEM, AND NON-TRANSITORY COMPUTER READABLE MEDIUM

(71) Applicant: FUJIFILM BUSINESS INNOVATION CORP., Tokyo (JP)

(72) Inventors: Yu Mishima, Kanagawa (JP); Ryo Matsumoto, Kanagawa (JP); Hideaki Sugimoto, Kanagawa (JP); Shigeo Miyata, Kanagawa (JP); Hiroyuki Mitsuhashi, Kanagawa (JP); Nozomi Noguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 172 days.

(21) Appl. No.: 16/570,078

(22) Filed: Sep. 13, 2019

(65) Prior Publication Data
US 2020/0099642 A1 Mar. 26, 2020

(30) Foreign Application Priority Data
Sep. 25, 2018 (JP) .............................. JP2018-179452

(51) Int. Cl.
*H04L 12/58* (2006.01)
*H04L 51/18* (2022.01)
*H04L 51/00* (2022.01)
*G06F 3/12* (2006.01)
*H04L 51/02* (2022.01)

(52) U.S. Cl.
CPC ............ *H04L 51/18* (2013.01); *G06F 3/1204* (2013.01); *G06F 3/1257* (2013.01); *H04L 51/16* (2013.01); *G06F 3/1288* (2013.01); *H04L 51/02* (2013.01)

(58) Field of Classification Search
None
See application file for complete search history.

(56) References Cited

U.S. PATENT DOCUMENTS

| 9,325,651 | B2 | 4/2016 | Sakuta et al. |
| 9,794,213 | B1* | 10/2017 | Greenberger ........ G06K 9/6215 |
| 2016/0231878 | A1* | 8/2016 | Tsuda ..................... H04L 51/04 |
| 2021/0247941 | A1* | 8/2021 | Sato ..................... G06F 3/1282 |

FOREIGN PATENT DOCUMENTS

JP 2014-164522 A 9/2014

* cited by examiner

*Primary Examiner* — Frantz Bataille
(74) *Attorney, Agent, or Firm* — Oliff PLC

(57) ABSTRACT

A control apparatus includes a receiving unit, a first controller, and a second controller. The receiving unit receives an instruction to execute a predetermined process corresponding to a post posted on a space provided by a service. The predetermined process is executed on one or more target posts posted on the space. The space presents posts in a predetermined direction in a chronological order. The first controller performs control to execute the predetermined process in response to the instruction. In a case where the one or more target posts of the predetermined process are posted on the space and a predetermined condition is satisfied, the second controller removes at least one post from the space and posts an alternative post corresponding to the removed at least one post on the space.

12 Claims, 11 Drawing Sheets

CONTROL APPARATUS, CONTROL SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-179452 filed Sep. 25, 2018.

BACKGROUND

(i) Technical Field

The present disclosure relates to control apparatuses, control systems, and non-transitory computer readable media.

(ii) Related Art

Japanese Unexamined Patent Application Publication No. 2014-164522 discloses a message notification apparatus including an operation-command detector, an external-device controller, an operation-result acquiring unit, a report-message generator, and a report-message display unit. The operation-command detector detects an operation command for operating an external device from a message in a communication service that displays messages written by members in a time-series fashion, and also identifies the member who has written the message as a commander of the operation command. The external-device controller controls the external device in accordance with the operation command detected by the operation-command detector. The operation-result acquiring unit acquires an operation result of the external device operating under the control of the external-device controller. The report-message generator generates a report message reporting the operation result acquired by the operation-result acquiring unit. The report-message display unit outputs the report message generated by the report-message generator to a server that provides the communication service, and causes the communication service to display the message in a state where the commander identified by the operation-command detector is specified as a destination.

In a service that displays information posted by a user in a chronological order in a predetermined direction and that is usable for commanding execution of a predetermined process corresponding to the posted information, if subsequent information is posted in a state where unprocessed information still exists, it may be difficult to distinguish the unprocessed information from other information.

SUMMARY

Aspects of non-limiting embodiments of the present disclosure relate to a control apparatus, a control system, and a non-transitory computer readable medium in which, in a service that displays information posted by a user in a chronological order in a predetermined direction and that is usable for commanding execution of a predetermined process corresponding to the posted information, unprocessed information is displayed in a clearly distinguishable manner when subsequent information is posted in a state where the unprocessed information still exists, as compared with a case where the posted information is continuously displayed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control apparatus including a receiving unit, a first controller, and a second controller. The receiving unit receives an instruction to execute a predetermined process corresponding to a post posted on a space provided by a service. The predetermined process is executed on one or more target posts posted on the space. The space presents posts in a predetermined direction in a chronological order. The first controller performs control to execute the predetermined process in response to the instruction. In a case where the one or more target posts of the predetermined process are posted on the space and a predetermined condition is satisfied, the second controller removes at least one post from the space and posts an alternative post corresponding to the removed at least one post on the space.

BRIEF DESCRIPTION OF THE DRAWINGS

Exemplary embodiments of the present disclosure will be described in detail based on the following figures, wherein.

DETAILED DESCRIPTION

Figure 1:
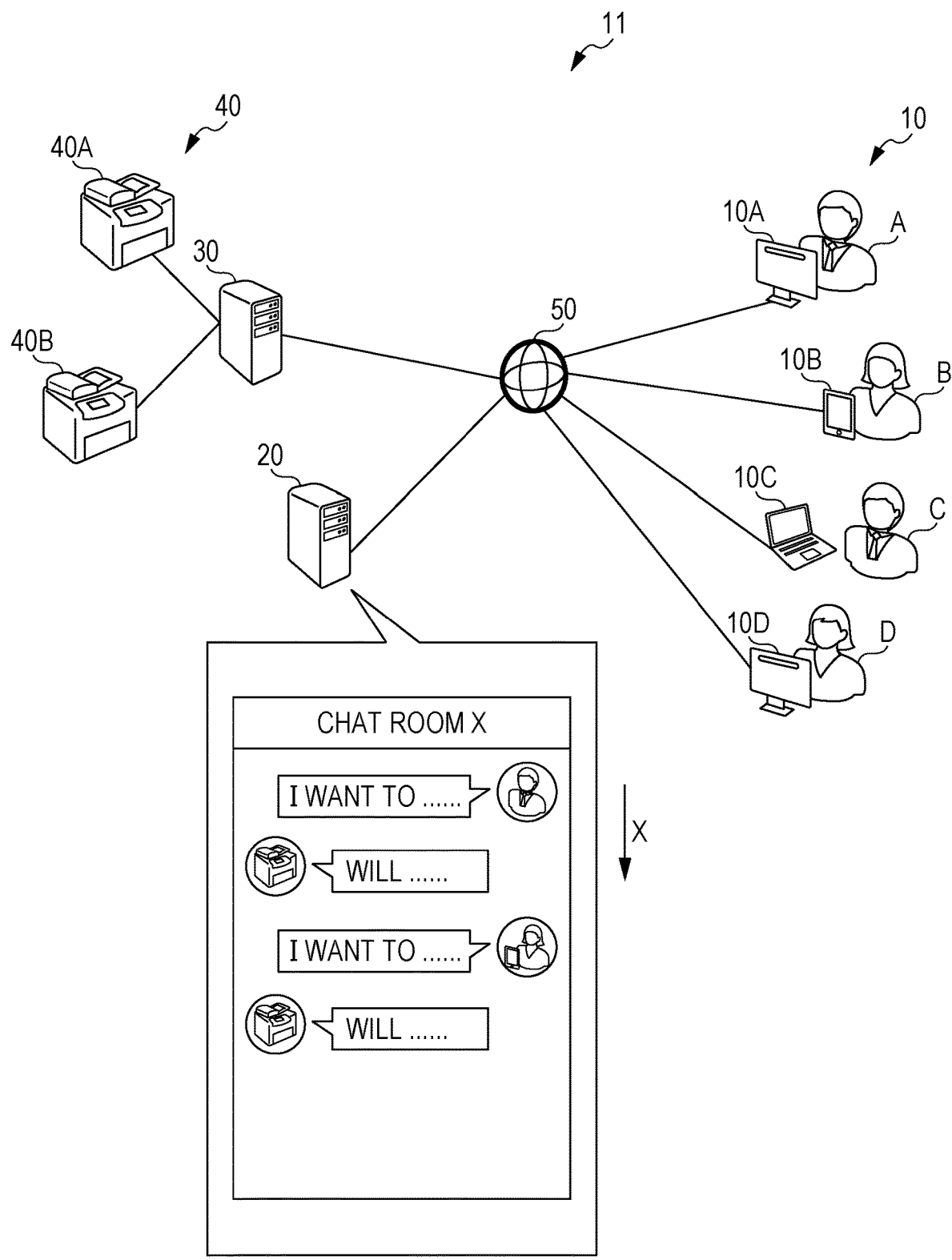
FIG. 1 schematically illustrates the configuration of a control system according to an exemplary embodiment.

Exemplary embodiments of the present disclosure will be described in detail below with reference to the drawings. In the drawings, identical or equivalent components and sections are given the same reference signs. Furthermore, the dimensional ratios in the drawings are exaggerated for the sake of convenience and may sometimes differ from the actual ratios. FIG. 1 schematically illustrates the configuration of a control system 11 according to an exemplary embodiment.

A control system 11 includes user terminals 10 as terminal apparatuses, a chat room server 20 as a providing apparatus, a chatbot server 30 as a control apparatus, and information processing apparatuses 40. The user terminals 10, the chat room server 20, and the chatbot server 30 are connected to one another by the Internet 50.

The user terminals 10 are terminals used by users and may be any type of terminals, such as desktop computers, notebook personal computers, tablets, and smartphones. In FIG. 1, it is assumed that a user A uses a user terminal 10A, a user B uses a user terminal 10B, a user C uses a user terminal 10C, and a user D uses a user terminal 10D. The user terminals 10A to 10D will collectively be referred to as "user terminals 10".

The chat room server 20 provides a chat room as a service. A chat room is a virtual space in which a user and a chatbot, to be described later, may participate and share data, such as a message and an image, as a chat. A chat is a conversation held by multiple members posting information in real time in a computer network. The term "members" includes both a user associated with a real-life person and a software robot operating in accordance with a specific rule. A chatbot is a software robot that performs control such that a specific process is executed based on a post posted in the chat room by a user. Multiple users or a single user may participate in the chat room.

A user is capable of posting a message or outputting speech in the chat room via the user terminal 10 of the user. In the chat room, users may share a message, and the chatbot may respond and reply to a user's message. Furthermore, in the chat room, a user may give a command to the chatbot so as to cause a corresponding one of the information processing apparatuses 40 to execute a specific process. For example, the chatbot performs control to extract a command included in a message by natural language processing and to cause the information processing apparatus 40 to execute a specific process. A single user and the chatbot may participate in the chat room in a one-to-one fashion, or multiple users and the chatbot may participate in the chat room. The number of chat rooms may be a plural value equal in number to opened chat rooms.

The chatbot server 30 manages the chatbot. As mentioned above, the chatbot participates in the chat room and responds to a user's message or causes the information processing apparatus 40 to execute a specific process in accordance with a command included in the message.

When the message related to the command for causing the information processing apparatus 40 to execute the specific process is posted in the chat room that the chatbot is participating in, the chatbot causes the information processing apparatus 40 registered in association with the users participating in the chat room to execute the specific process. The information processing apparatus 40 may perform any type of information processing. The term "information processing" includes, for example, a process for executing printing based on text data or image data, a process for generating or processing data by using equipment included in the information processing apparatus 40, and a process for exchanging data between the information processing apparatus 40 and another apparatus. The following description relates to an example where the information processing apparatus 40 is an image forming apparatus, and the command for executing the specific process is a command for causing the image forming apparatus to execute printing. In the following description, reference sign 40 is given to the image forming apparatus. The command for causing the image forming apparatus 40 to execute printing not only includes a direct printing command given to the image forming apparatus 40, but may also include information used for generating a print job, such as providing image data to be printed or print specifications in the chat room.

The image forming apparatus 40 forms an image on a recording medium, such as a sheet, based on a print job and may be any type of apparatus, such as a printer or a multifunction apparatus. In the example of the control system 11 shown in FIG. 1, an image forming apparatus 40A and an image forming apparatus 40B are managed by the chatbot server 30. The image forming apparatus 40A and the image forming apparatus 40B will collectively be referred to as "image forming apparatuses 40". Although the image forming apparatuses 40 are connected to the chatbot server 30 in the example shown in FIG. 1, the image forming apparatuses 40 may alternatively be connected to the chatbot server 30 via the Internet 50.

Next, the hardware configurations of the chat room server 20 and the chatbot server 30 will be described.

Figure 2:
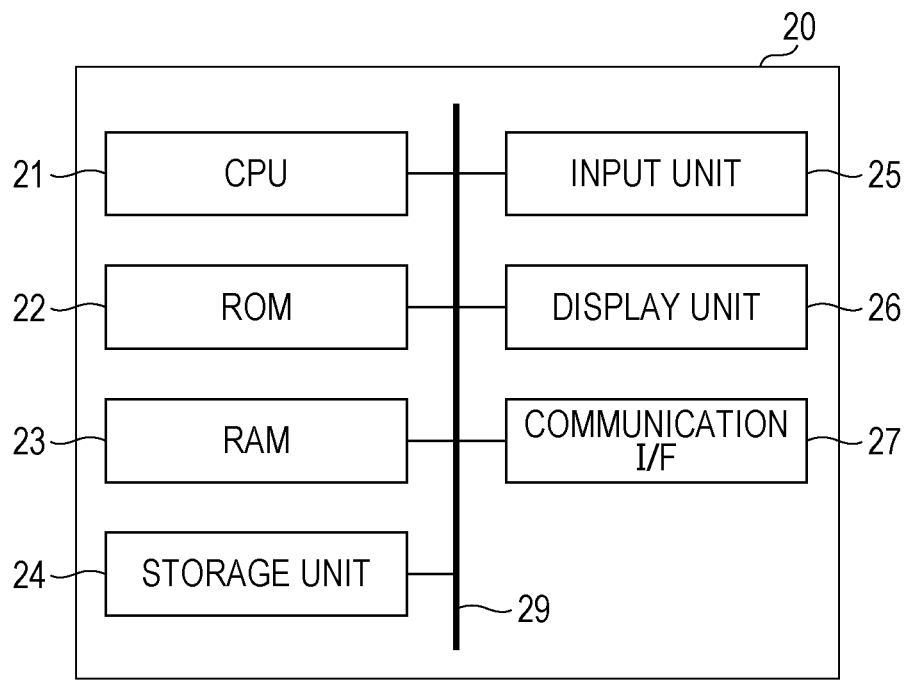
FIG. 2 is a block diagram illustrating the hardware configuration of a chat room server.

First, the hardware configuration of the chat room server 20 will be described. FIG. 2 is a block diagram illustrating the hardware configuration of the chat room server 20.

As shown in FIG. 2, the chat room server 20 includes components, such as a central processing unit (CPU) 21, a read-only memory (ROM) 22, a random access memory (RAM) 23, a storage unit 24, an input unit 25, a display unit 26, and a communication interface (I/F) 27. These components are connected to one another in a communicable manner via a bus 29.

The CPU 21 is a central processing unit executing various types of programs and controlling each unit. Specifically, the CPU 21 loads a program from the ROM 22 or the storage unit 24 and executes the program by using the RAM 23 as a work area. The CPU 21 controls each of the aforementioned components and performs various types of arithmetic processing in accordance with programs stored in the ROM 22 or the storage unit 24. In this exemplary embodiment, the ROM 22 or the storage unit 24 stores a chat-room providing program that provides the chat room.

The ROM 22 stores various types of programs and various types of data. The RAM 23 serves as a work area that temporarily stores a program or data. The storage unit 24 is constituted of a hard disk drive (HDD) or a solid state drive (SSD) and stores various types of programs including the operating system, as well as various types of data.

The input unit 25 includes a pointing device, such as a mouse, and a keyboard, and is used for performing various types of input operations. The display unit 26 is, for example, a liquid crystal display and displays various types of information. The display unit 26 may be of a touchscreen type so as to also function as the input unit 25. The communication I/F 27 communicates with another apparatus via the Internet 50. For example, the standard used with respect to the communication I/F 27 may be Ethernet (registered trademark), fiber distributed data interface (FDDI), or Wi-Fi (registered trademark).

Figure 3:
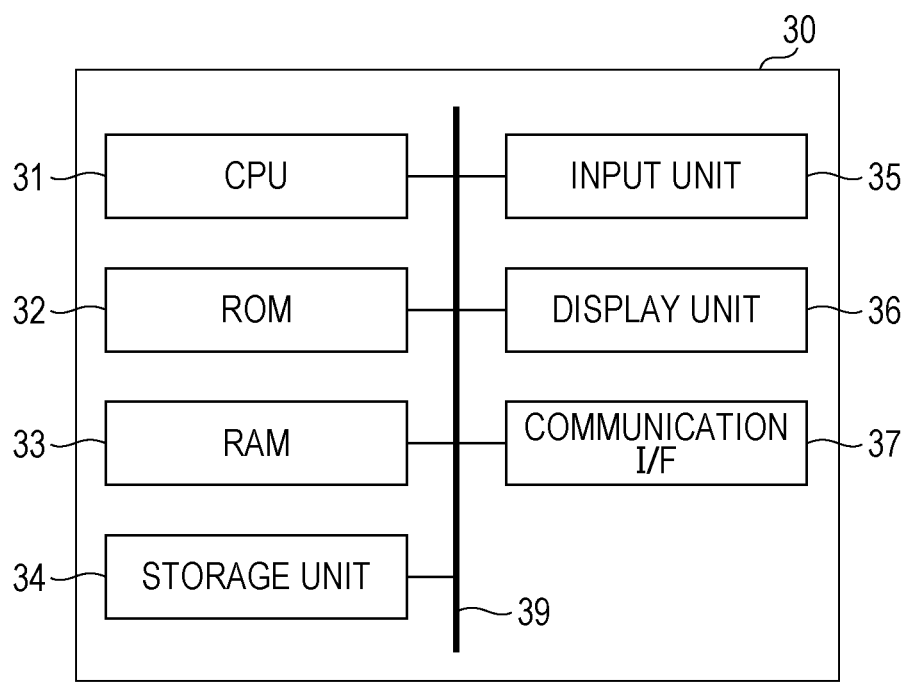
FIG. 3 is a block diagram illustrating the hardware configuration of a chatbot server.

Next, the hardware configuration of the chatbot server 30 will be described. FIG. 3 is a block diagram illustrating the hardware configuration of the chatbot server 30.

As shown in FIG. 3, the chatbot server 30 includes components, such as a CPU 31, a ROM 32, a RAM 33, a storage unit 34, an input unit 35, a display unit 36, and a communication I/F 37. These components are connected to one another in a communicable manner via a bus 39. The components of the chatbot server 30 have functions similar to those of the components of the chat room server 20 in FIG. 2.

Next, the functional configurations of the chat room server 20 and the chatbot server 30 will be described.

Figure 4:
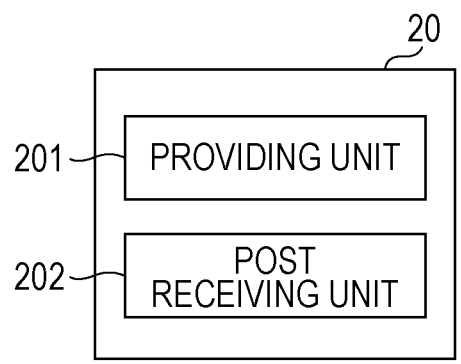
FIG. 4 is a block diagram illustrating an example of the functional configuration of the chat room server.

First, the functional configuration of the chat room server 20 will be described. FIG. 4 is a block diagram illustrating an example of the functional configuration of the chat room server 20.

As shown in FIG. 4, the chat room server 20 has a providing unit 201 and a post receiving unit 202 as functional components. These functional components are realized by the CPU 21 loading the chat-room providing program stored in the ROM 22 or the storage unit 24 and developing and executing the chat-room providing program in the RAM 23.

The providing unit 201 provides, as a service, a chat room in which multiple users may participate and post messages. The chat room server 20 provides a chat room in which a single user and the chatbot may participate in a one-to-one fashion, and also provides a chat room in which multiple users and the chatbot may participate. Multiple chat rooms may be opened in accordance with an open request from a user. Furthermore, for example, if a certain user makes a chat-room open request by accessing the chat room server 20 and opens a specific chat room, the user who is the chat-room opener may invite another user to participate in the opened chat room. Alternatively, a user who is already participating in a chat room may invite another user not participating in the chat room to newly participate in the chat room.

The post receiving unit 202 receives information input via a user terminal 10 operated by a user participating in the chat room and posts the input information in the chat room provided by the providing unit 201. Posts posted in the chat room are displayed on the user terminal 10 in a chronological order in a predetermined direction. In this exemplary embodiment, the posts are displayed in a chronological order from top to bottom on a screen on which the chat room is displayed, as indicated by an arrow X in FIG. 1.

Figure 5:
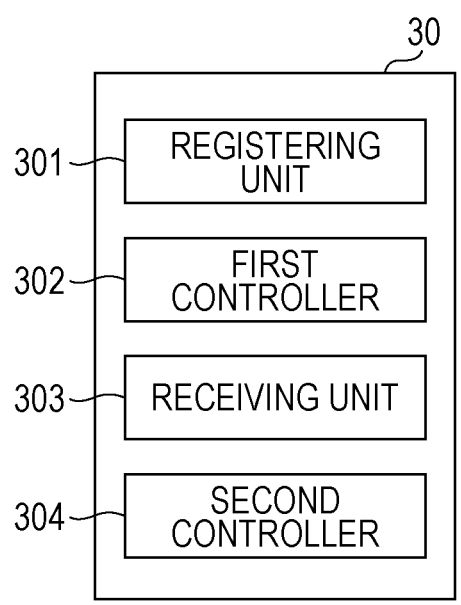
FIG. 5 is a block diagram illustrating an example of the functional configuration of the chatbot server.

Next, the functional configuration of the chatbot server 30 will be described. FIG. 5 is a block diagram illustrating an example of the functional configuration of the chatbot server 30.

As shown in FIG. 5, the chatbot server 30 has, as functional components, a registering unit 301, a first controller 302, a receiving unit 303, and a second controller 304. These functional components are realized by the CPU 31 loading a control program stored in the ROM 32 or the storage unit 34 and developing and executing the control program in the RAM 33.

The registering unit 301 registers a user and an image forming apparatus 40 in association with each other. By registering an image forming apparatus 40 with a user, printing using the image forming apparatus 40 is performed in response to a request from the user.

The first controller 302 participates as a chatbot in the chat room and controls a conversation with a user participating in the chat room. If a command for causing an image forming apparatus (information processing apparatus) 40 to execute printing is received in the chat room, or if a command message related to the command is posted in the chat room by the user, the first controller 302 performs control to cause one of the image forming apparatuses 40 associated with the user participating in the chat room to execute printing. Even if a command message is posted in the chat room by a user with which none of the image forming apparatuses 40 is associated, the first controller 302 still performs control to cause one of the image forming apparatuses 40 to execute printing.

The receiving unit 303 receives, as a print command, a reply made to an inquiry posted in the chat room by the chatbot for printing an image posted in the chat room via a user terminal 10. Alternatively, the receiving unit 303 receives a command for printing using an image forming apparatus 40 from a post posted in the chat room from the user terminal 10.

In a case where one or more posts including information corresponding to a print command are posted in the service in a chronological order in the predetermined direction and a predetermined condition is satisfied, the second controller 304 removes at least one of the posts from the chat room. Then, the second controller 304 performs control for displaying an alternative post, as a new post, corresponding to the removed post. If a subsequent post is posted in a state where an unprocessed post still exists, it may become difficult to distinguish the unprocessed post from other posts. Therefore, the second controller 304 removes at least one of the posts when the predetermined condition is satisfied and displays an alternative post corresponding to the removed post. Accordingly, unprocessed posts that have previously been posted may be ascertained more readily.

The following description relates to an example where compilation-layout display, in which removed posts are compiled, or carousel-layout display is performed with respect to an alternative post. Compilation-layout display involves, for example, displaying posted images in a multilayer fashion such that a representative image (such as the first or last posted image) among compiled images is disposed at the front. If an operation is performed on the compilation-layout display, detailed information is displayed or carousel-layout display is performed. In this exemplary embodiment, carousel-layout display involves displaying information in a slidably-operable manner in a direction intersecting the direction for displaying information, such as messages, in the chat room in a chronological order in the predetermined direction. The direction intersecting the direction for displaying information, such as messages, in a chronological order in the predetermined direction may sometimes be referred to as a direction intersecting a scrolling direction of the chat room.

The following description relates to a specific process performed in the chatbot server 30 of the control system 11 having the above-described configuration.

First Exemplary Embodiment

Figure 6:
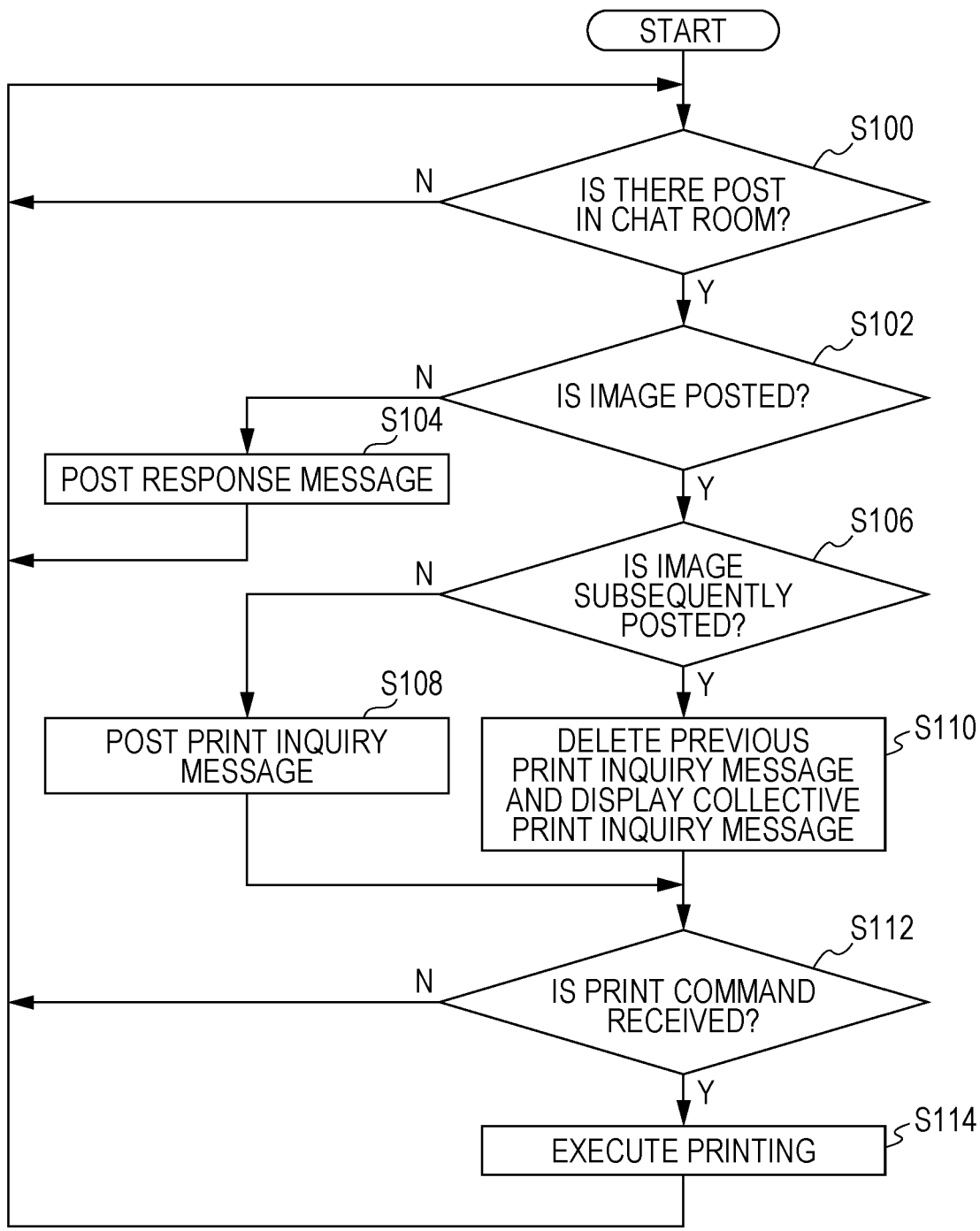
FIG. 6 is a flowchart illustrating an example of the flow of a process performed in the chatbot server according to a first exemplary embodiment.

In a first exemplary embodiment, when a user posts an image, such as a photograph, in the chat room from a user terminal 10, the chatbot server 30 posts an inquiry about whether or not to print the image to the user. If the user gives a print command in response to this inquiry, the chatbot server 30 performs a process for causing the corresponding image forming apparatus 40 to perform printing. FIG. 6 is a flowchart illustrating an example of the flow of the process performed in the chatbot server 30 according to this exemplary embodiment. For example, the process in FIG. 6 starts when the user accesses the chat room from the user terminal 10 and ends when the user exits the chat room.

In step S100, the first controller 302 determines whether or not, for example, a message is posted in the chat room by the user. If a negative determination result indicating that there is no post in the chat room is obtained, the first controller 302 waits until a positive detection result is obtained. Then, the process proceeds to step S102.

In step S102, the first controller 302 determines whether or not the post in the chat room from the user is an image, such as a photograph. If the post in the chat room is not an image but is a message, a negative determination result is obtained. In this case, the process proceeds to step S104. If a positive determination result is obtained, the process proceeds to step S106.

In step S104, the first controller 302 posts a response message in the chat room that corresponds to the message posted in the chat room. The process then returns to step S100 to repeat the above-described process. For example, if a message asking about the weather is posted, the CPU 31 acting as the chatbot acquires information about the weather from the Internet and posts a weather-related reply message in the chat room. Accordingly, a conversation between the user and the chatbot is established in the chat room.

In step S106, the first controller 302 subsequently determines whether or not an image, such as a photograph, is posted in the chat room. If a negative determination result is obtained, the process proceeds to step S108. If a positive determination result is obtained, the process proceeds to step S110.

Figure 7:
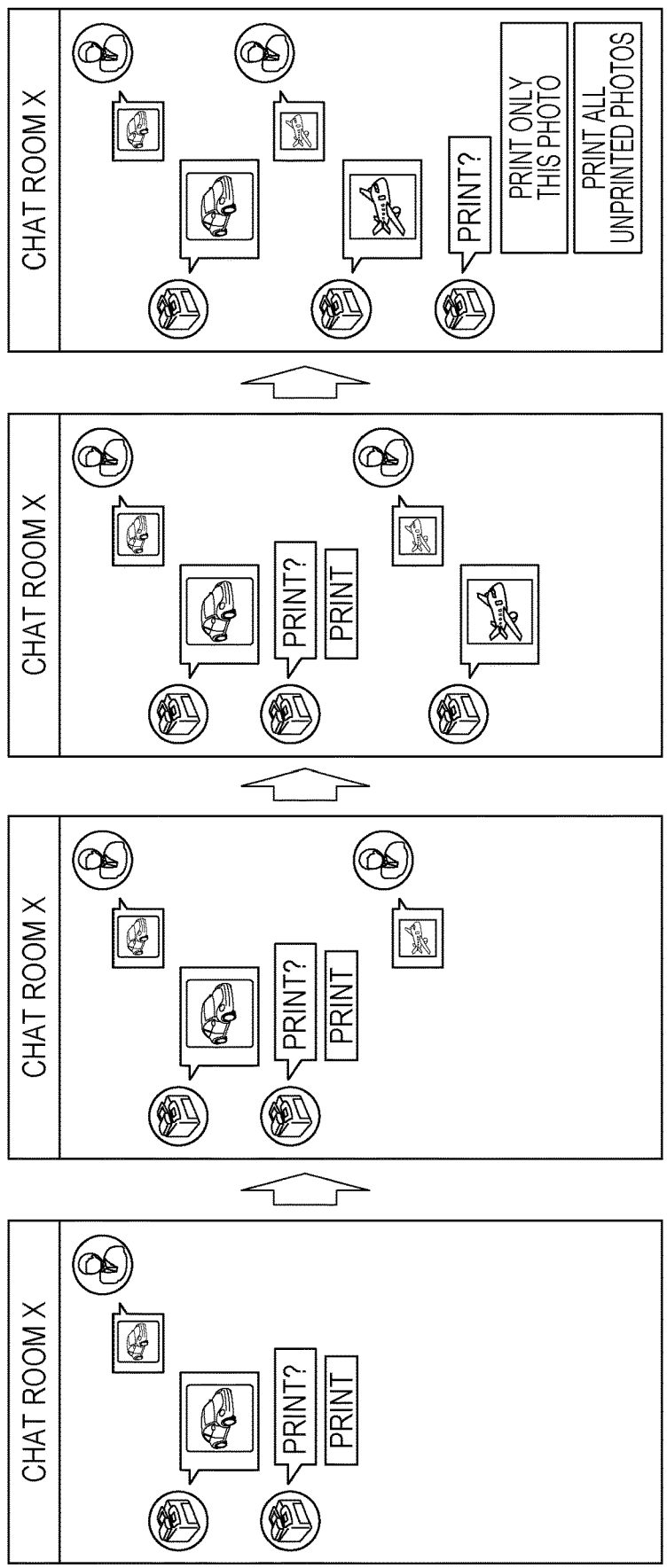
FIG. 7 illustrates an example of the state of a chat room displayed as a result of the process performed in the chatbot server according to the first exemplary embodiment.

In step S108, the first controller 302 posts a print inquiry message, and the process then proceeds to step S112. For example, as shown in FIG. 7, an image posted by the user and an inquiry "print?" as a print inquiry message are posted in the chat room. Moreover, an option "print" for giving a print command is posted and displayed as an operation-receivable button in the chat room.

In step S110, the second controller 304 removes the message (i.e., the message for inquiring about printing) posted as a result of step S108 performed on the previous image, and displays a collective message for multiple images in the chat room. The process then proceeds to step S112. Specifically, the second controller 304 removes the message for the image posted and displayed in the chat room. Then, the second controller 304 performs display control such that a collective inquiry for the multiple images serving as an alternative post corresponding to the removed post is displayed. For example, as shown in FIG. 7, when a first image is posted, the chatbot posts an inquiry A (i.e., a message inquiring about printing and a button for receiving a print command). Then, the user posts a subsequent image in the chat room. When images are successively posted in this manner, the inquiry is removed. Then, as an inquiry for multiple images, an inquiry B (i.e., a message "print?", a button for giving a command "print only this photo", and a button for giving a command "print all unprinted photos") is posted in the chat room.

In step S112, the receiving unit 303 determines whether or not a print command is received. This determination process involves, for example, determining whether or not an operation corresponding to the "print?" button, the "print only this photo" button, or the "print all unprinted photos" button displayed in the chat room together with the message inquiring about printing, as shown in FIG. 7, is received. If a negative determination result is obtained, the process returns to step S100 to repeat the above-described process. If a positive determination result is obtained, the process proceeds to step S114.

In step S114, the first controller 302 causes the image forming apparatus 40 preregistered by the registering unit 301 to execute printing. The process then returns to step S100 to repeat the above-described process.

Second Exemplary Embodiment

Figure 8:
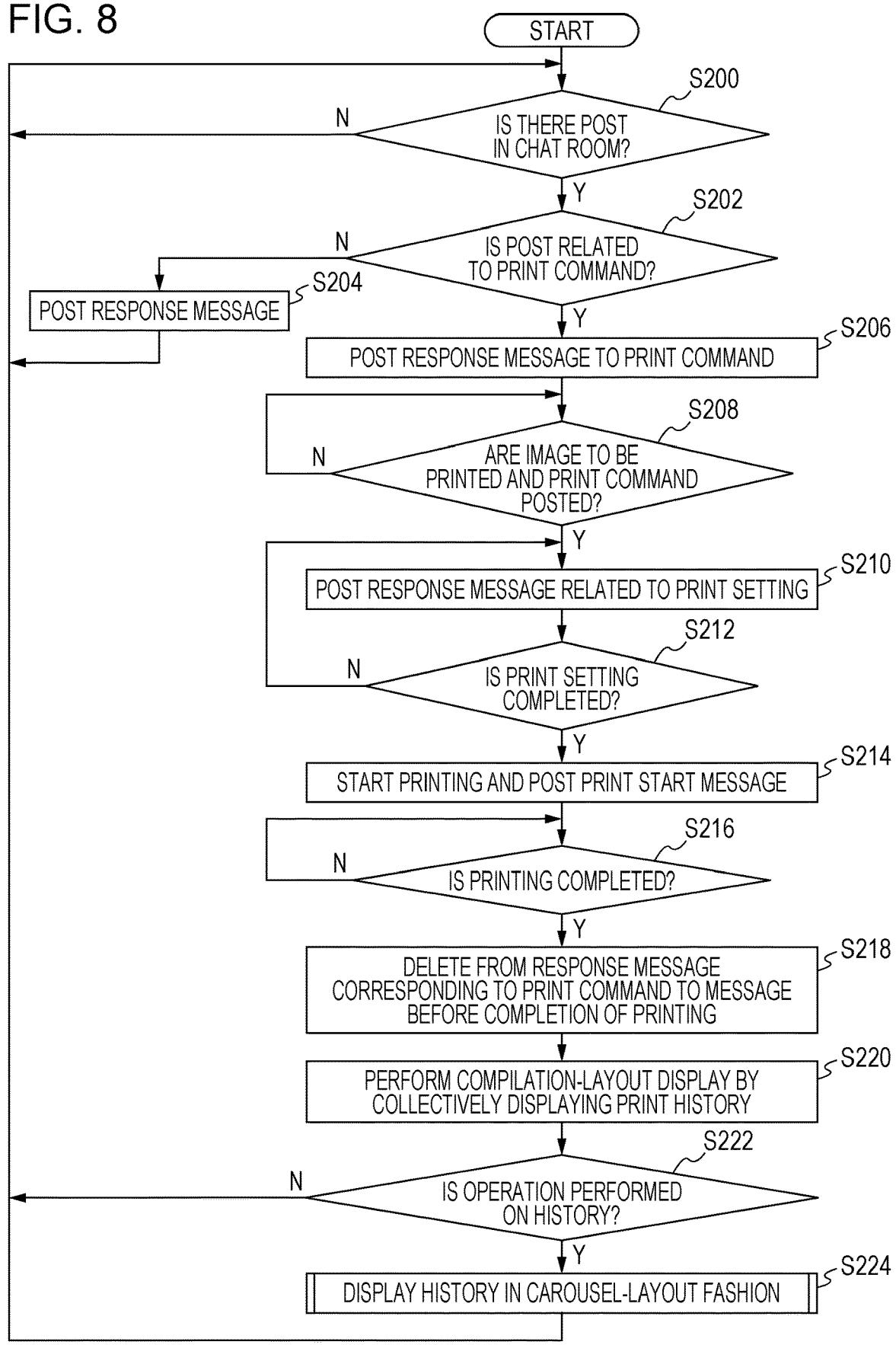
FIG. 8 is a flowchart illustrating an example of the flow of a process performed in the chatbot server according to a second exemplary embodiment.

In a second exemplary embodiment, a user posts, in the chat room, a message expressing an intention of printing from a user terminal 10, and subsequently posts an image, to be printed, in the chat room. Then, a message expressing a print command is posted so that printing is performed by the corresponding image forming apparatus 40. This process performed by the chatbot server 30 will be described below. FIG. 8 is a flowchart illustrating an example of the flow of the process performed in the chatbot server 30 according to this exemplary embodiment. For example, the process in FIG. 8 starts when the user accesses the chat room from the user terminal 10 and ends when the user exits the chat room.

In step S200, the first controller 302 determines whether or not, for example, a message is posted in the chat room by the user. If a negative determination result indicating that there is no post in the chat room is obtained, the first controller 302 waits until a positive detection result is obtained. Then, the process proceeds to step S202.

Figure 9:
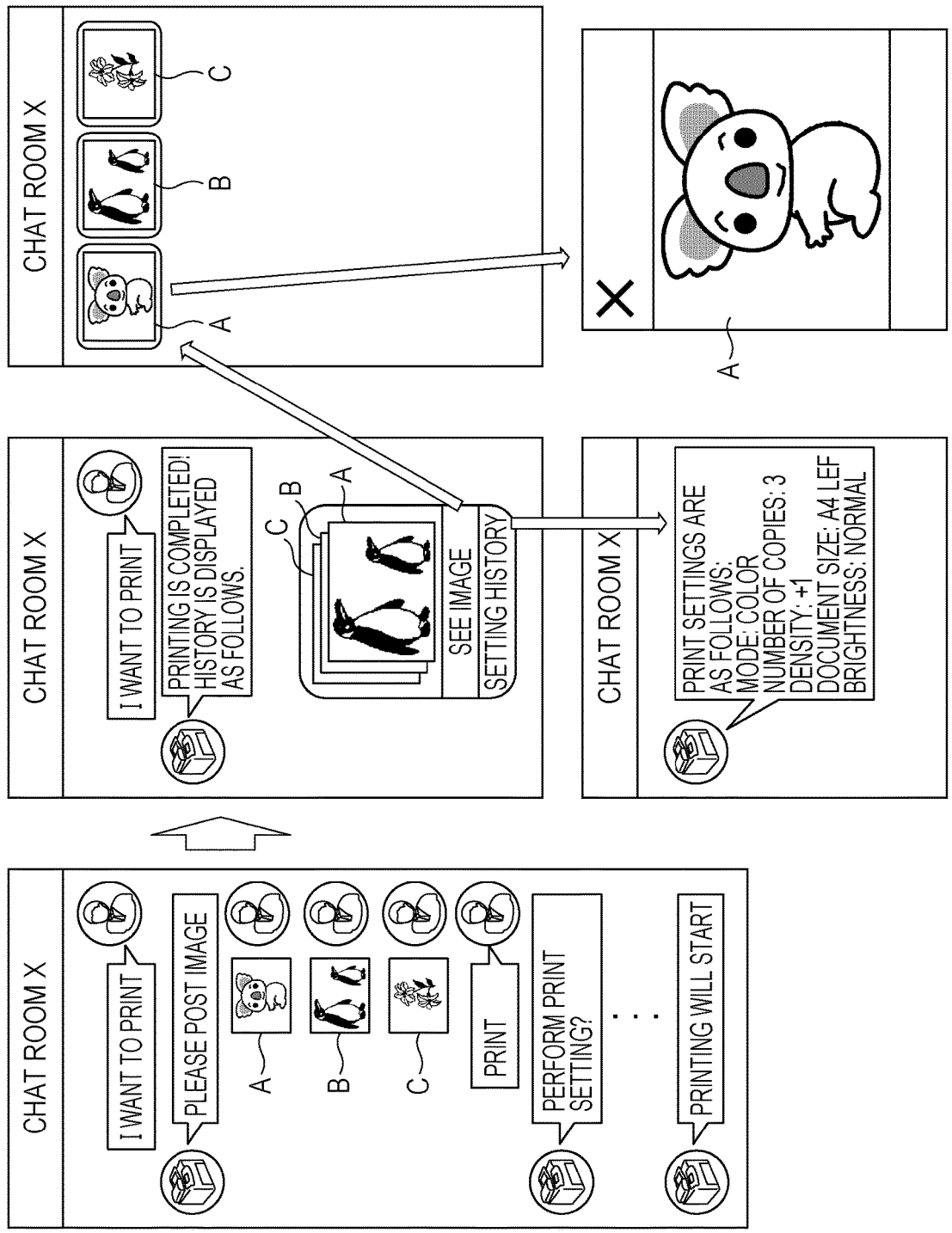
FIG. 9 illustrates an example of the state of the chat room displayed as a result of the process performed in the chatbot server according to the second exemplary embodiment.

In step S202, the first controller 302 determines whether or not the post in the chat room is a command message related to a print command. This determination process involves, for example, performing natural language processing on the posted message and determining that the post is related to a print command if the posted message includes a term related to "print" or "print setting". For example, as shown in FIG. 9, a positive determination result is obtained when a message "I want to print" is posted. If a negative determination result is obtained, the process proceeds to step S204. If a positive determination result is obtained, the process proceeds to step S206.

In step S204, the first controller 302 posts, in the chat room, a response message to the message posted in the chat room. The process then returns to step S200 to repeat the above-described process. For example, if a message asking about the weather is posted, the CPU 31 acting as the chatbot acquires information about the weather from the Internet and posts a weather-related reply message in the chat room. Accordingly, a conversation between the user and the chatbot is established in the chat room.

In step S206, the first controller 302 posts, in the chat room, a response message to the message related to the print command posted in the chat room, and the process then proceeds to step S208. For example, as shown in FIG. 9, a message "please post image" is posted in the chat room as the response message to the message related to the print command.

In step S208, the receiving unit 303 determines whether or not an image to be printed is posted in the chat room and a print command is received. For example, as shown in FIG. 9, this determination process involves posting an image to be printed in the chat room. If a message "print" is posted, a positive determination result is obtained. The receiving unit 303 waits until a positive determination result is obtained, and the process then proceeds to step S210.

In step S210, the first controller 302 posts a response message related to print setting in the chat room, and the process then proceeds to step S212. For example, as shown in FIG. 9, a message "perform print setting?" is posted in the chat room as the response message related to print setting.

In step S212, the first controller 302 determines whether the print setting is completed. This determination process involves determining whether or not the print setting is completed based on a conversation between the chatbot and the user. The first controller 302 waits until a positive determination result is obtained, and the process then proceeds to step S214.

In step S214, the first controller 302 causes the image forming apparatus 40 preregistered by the registering unit 301 to execute printing and posts a print start message in the chat room. The process then proceeds to step S216. For example, as shown in FIG. 9, a message "printing will start" is posted as the print start message.

In step S216, the first controller 302 determines whether or not the printing is completed. This determination process involves causing the image forming apparatus 40 to execute printing and determining whether or not the printing is completed. The first controller 302 waits until a positive determination result is obtained, and the process then proceeds to step S218.

In step S218, the second controller 304 deletes from the response message corresponding to the print command to the message immediately before the completion of printing. The process then proceeds to step S220.

In step S220, the second controller 304 performs compilation-layout display by collectively displaying the print history, and the process then proceeds to step S222. Specifically, the second controller 304 changes the display mode such that the exchanging of messages posted and displayed in the chat room from the print command to the print completion is removed and the print history is collectively displayed in a compilation-layout fashion as an alternative post corresponding to the removed messages. For example, as shown in FIG. 9, three images A to C are collectively displayed in a compilation-layout fashion. FIG. 9 illustrates an example of compilation-layout display in which the three images A to C are collectively displayed such that the images A, B, and C are disposed in that order in a multilayer fashion with the image A being disposed at the front.

In step S222, the receiving unit 303 determines whether or not an operation performed on the print history displayed in a compilation-layout fashion is received. For example, the receiving unit 303 determines whether or not an option "see image" shown in FIG. 9 is selected. If a positive determination result is obtained, the process proceeds to step S224. If a negative determination result is obtained, the process returns to step S200 to repeat the above-described process.

In step S224, the second controller 304 changes the display mode such that the history of printed images is displayed in a carousel-layout fashion. The process then returns to step S200 to repeat the above-described process. For example, as shown in FIG. 9, when the option "see image" is selected, the three images A to C removed from the chat room and displayed in a compilation-layout fashion are displayed in a carousel-layout fashion such that the images are scrollable (slidable) in the direction (i.e., horizontal direction in FIG. 9) intersecting the scrolling direction (i.e., vertical direction in FIG. 9) of the chat room. Although FIG. 9 illustrates an example where there is no scroll bar for the carousel-layout display since the three images A to C are displayed on the screen, if there are images equal to or larger than the number of images displayable in the horizontal direction in FIG. 9, the images are displayed by being scrolled in the horizontal direction in FIG. 9. If any one of the carousel-layout-displayed images A to C is selected, the selected image is displayed in an expanded manner, as shown in FIG. 9. Although not explained in FIG. 8 for simplifying the description, the print-setting history is displayed if an option "setting history" is operated, as shown in FIG. 9.

Third Exemplary Embodiment

Figure 10:
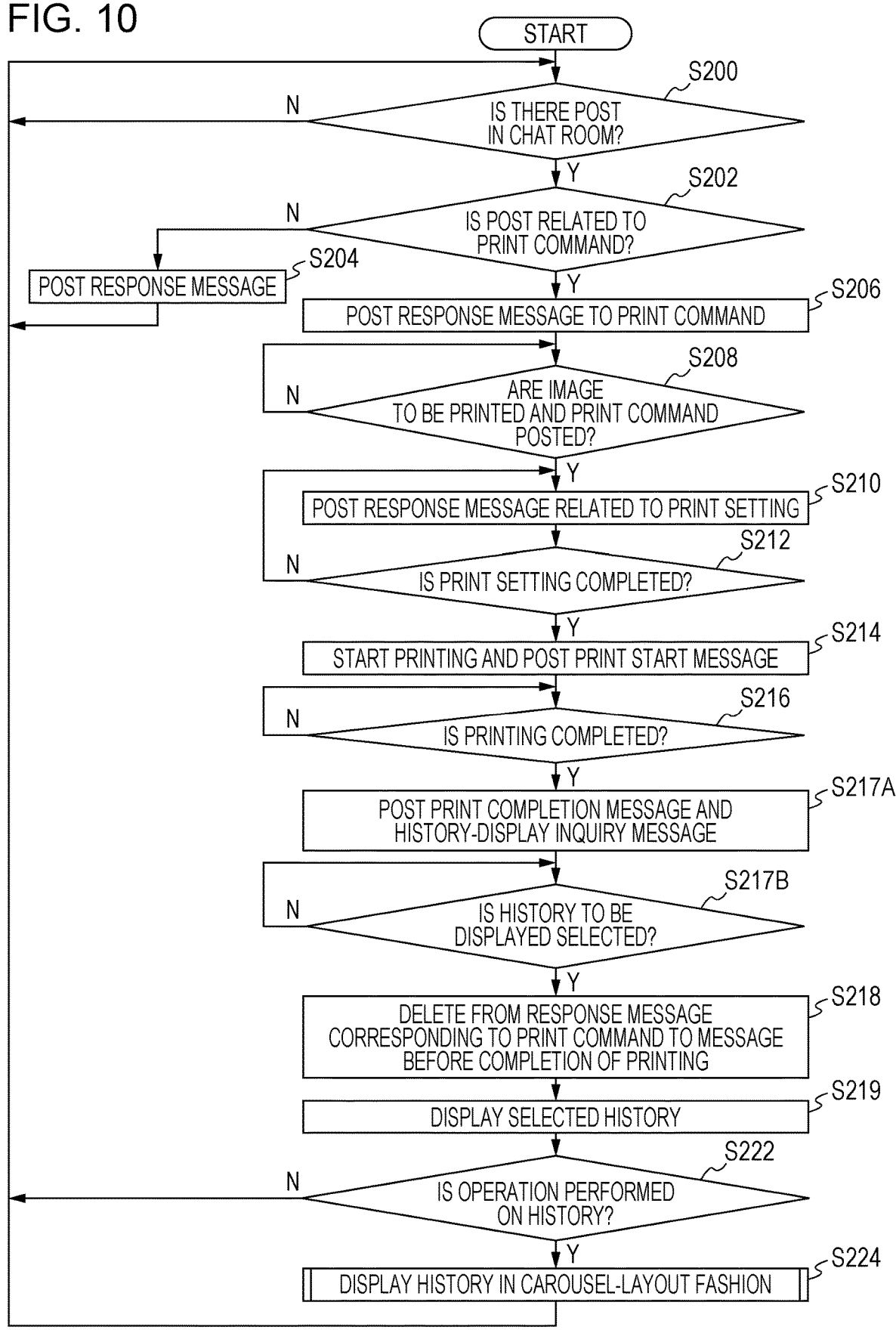
FIG. 10 is a flowchart illustrating an example of the flow of a process performed in the chatbot server according to a third exemplary embodiment.

A third exemplary embodiment is a first modification of the second exemplary embodiment. In this exemplary embodiment, the history retained as the print history in the second exemplary embodiment is selectable. FIG. 10 is a flowchart illustrating an example of the flow of a process performed in the chatbot server 30 according to this exemplary embodiment. For example, the process in FIG. 10 starts when the user accesses the chat room from the user terminal 10 and ends when the user exits the chat room. Steps identical to those in the process shown in FIG. 8 are given the same reference signs, and descriptions of some of the steps are omitted.

Steps S200 to S216 are performed similarly to the second exemplary embodiment, and when a positive determination result is obtained in step S216, the process proceeds to step S217A.

Figure 11:
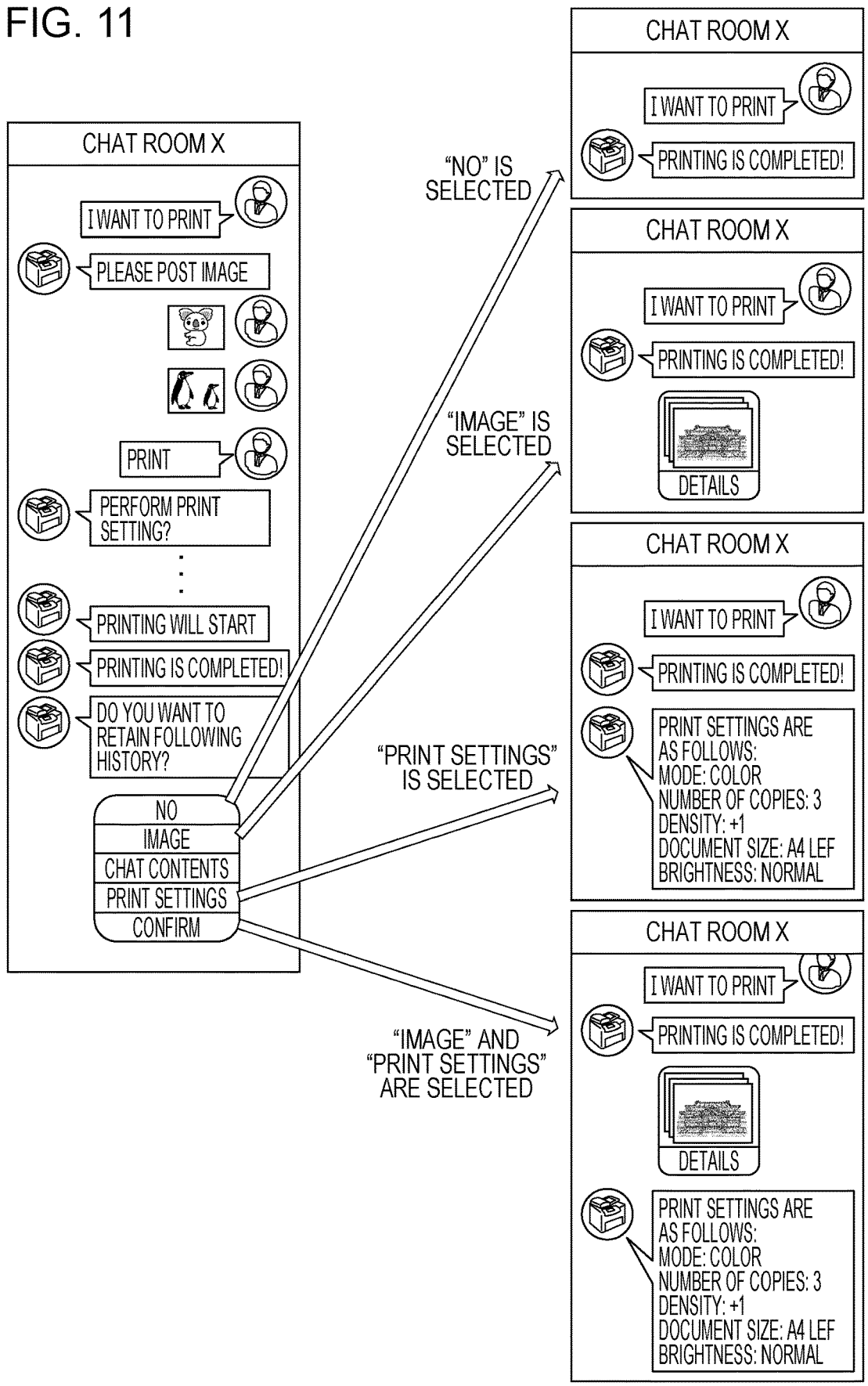
FIG. 11 illustrates an example of the state of the chat room displayed as a result of the process performed in the chatbot server according to the third exemplary embodiment.

In step S217A, the second controller 304 posts a print completion message and a history-display inquiry message in the chat room, and the process then proceeds to step S217B. For example, as shown in FIG. 11, messages "printing is completed!", and "do you want to retain following history?" are posted, and selectable elements for history selection are also posted. FIG. 11 illustrates an example where a "no" button, an "image" button, a "chat contents" button, a "print settings" button, and a "confirm" button are displayed as the selectable elements for history selection. In detail, in the example in FIG. 11, if the history is not to be retained or is to be retained, at least one of the "image" button, the "chat contents" button, and the "print settings" button is selected, and the "confirm" button is subsequently operated, whereby history selection is performed.

In step S217B, the second controller 304 determines whether or not the history to be displayed is selected. For example, in the example in FIG. 11, this determination process involves determining whether or not at least one of the "image" button, the "chat contents" button, and the "print settings" button is selected if the "no" button for not retaining the history is selected or if the history is to be retained. The second controller 304 waits until a positive determination result is obtained, and the process then proceeds to step S218.

In step S218, the second controller 304 deletes from the response message corresponding to the print command to the message immediately before the completion of printing. The process then proceeds to step S219.

In step S219, the second controller 304 posts and displays the selected history in the chat room. The process then proceeds to step S222. Subsequently, steps S222 and S224 described above are performed. Specifically, the second controller 304 changes the display mode such that the exchanging of messages posted and displayed in the chat room from the print command to the print completion is removed and the selected history is displayed as an alternative post corresponding to the removed messages. For example, as shown in FIG. 11, if the option "no" is selected, the exchanging of messages from the message "please post image" to the message "printing will start" is removed, and only the messages "I want to print" and "printing is completed!" are displayed. If the option "image" is selected, the images in the history are displayed in a compilation-layout fashion. If the receiving unit 303 receives an operation corresponding to an option "details" for the images displayed in a compilation-layout fashion shown in FIG. 11, the images removed from the chat room and displayed in a compilation-layout fashion are displayed in a carousel-layout fashion such that the images are scrollable (slidable) in the direction (i.e., horizontal direction in FIG. 11) intersecting the scrolling direction (i.e., vertical direction in FIG. 11) of the chat room. If the option "print settings" is selected, the history of the print settings is displayed, as shown in FIG. 11. If the options "image" and "print settings" are selected, the images in the history are displayed in a compilation-layout fashion and the history of the print settings is displayed, as shown in FIG. 11.

Fourth Exemplary Embodiment

Figure 12:
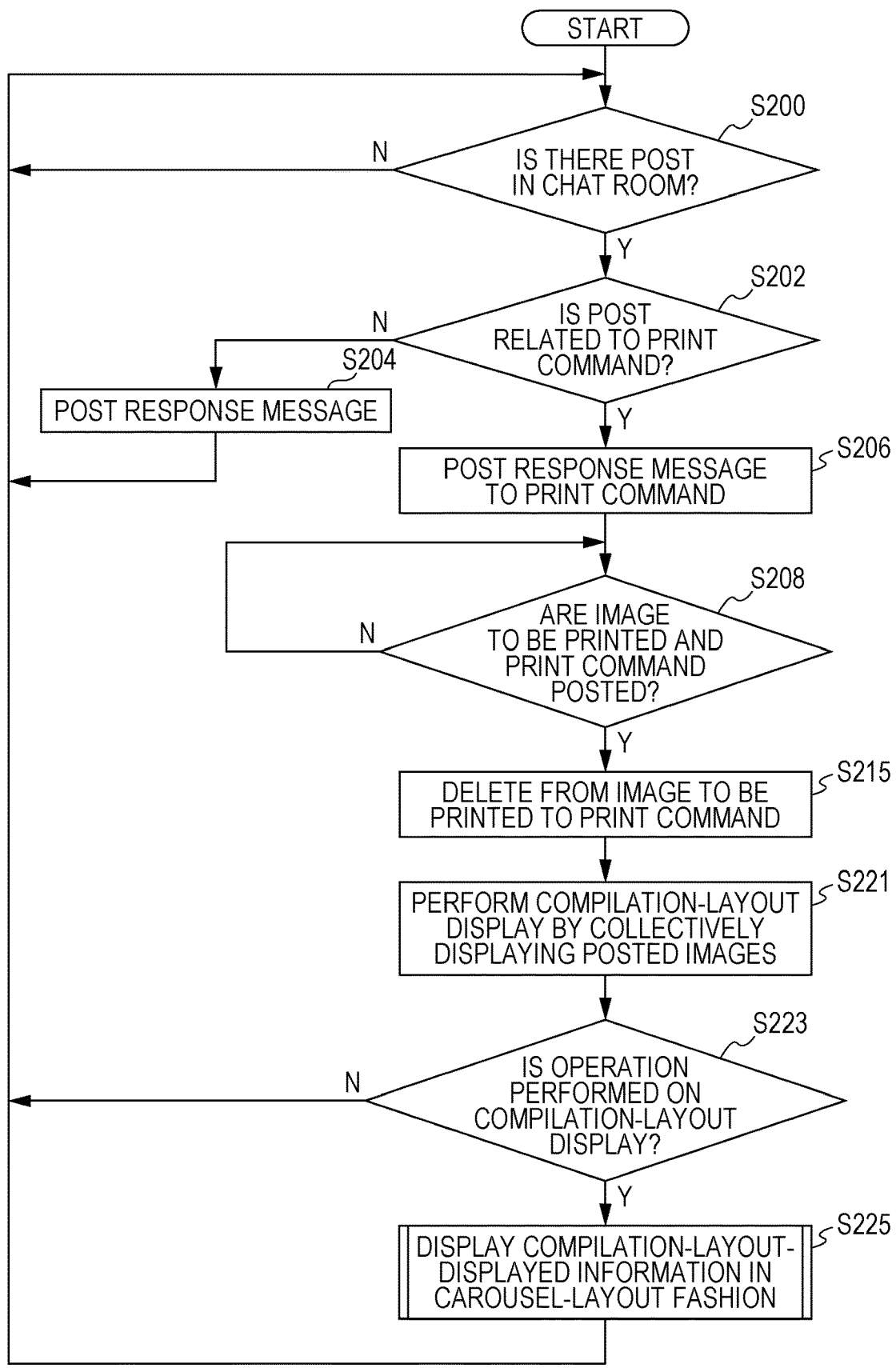
FIG. 12 is a flowchart illustrating an example of the flow of a process performed in the chatbot server according to a fourth exemplary embodiment.

A fourth exemplary embodiment is a second modification of the second exemplary embodiment. Unlike the second exemplary embodiment in which the display mode is changed when the printing is completed, the display mode is changed in this exemplary embodiment when the printing starts. FIG. 12 is a flowchart illustrating an example of the flow of a process performed in the chatbot server 30 according to this exemplary embodiment. For example, the process in FIG. 12 starts when the user accesses the chat room from the user terminal 10 and ends when the user exits the chat room. Steps identical to those in the process shown in FIG. 8 are given the same reference signs, and descriptions of some of the steps are omitted.

When steps S200 to S208 are performed similarly to the second exemplary embodiment, the process proceeds to step S215.

In step S215, the second controller 304 deletes from the image to be printed to the print command. The process then proceeds to step S221.

Figure 13:
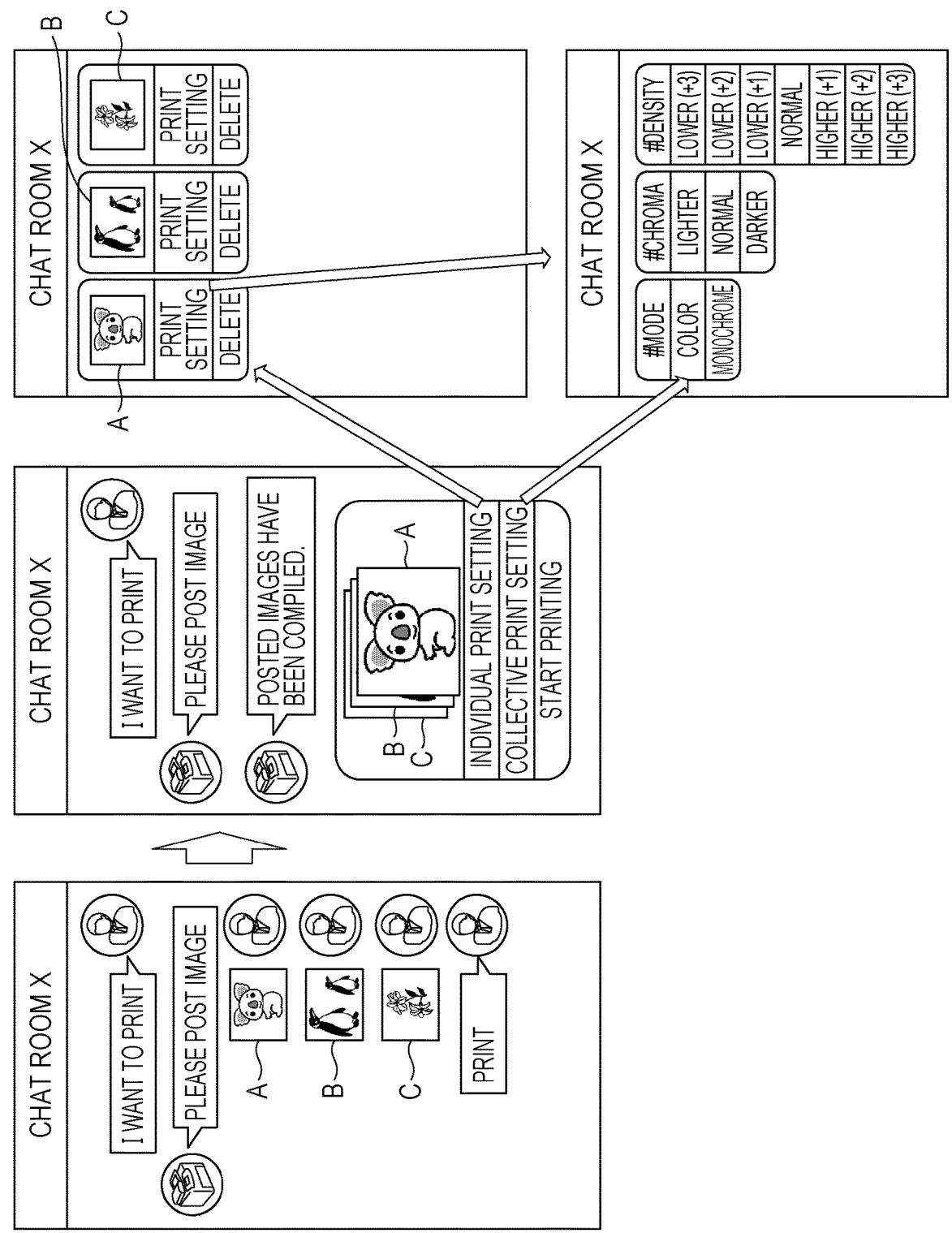
FIG. 13 illustrates an example of the state of the chat room displayed as a result of the process performed in the chatbot server according to the fourth exemplary embodiment.

In step S221, the second controller 304 collectively displays the images to be printed posted in the chat room in a compilation-layout fashion. The process then proceeds to step S223. Specifically, the second controller 304 changes the display mode such that the posts displayed in the chat room and including messages from the images to be printed to the print command are removed and the removed images are collectively displayed in a compilation-layout fashion as alternative posts corresponding to the removed posts. For example, as shown in FIG. 13, the compilation-layout display involves, for example, collectively displaying three images A to C in a multilayer fashion such that a representative image among the images A to C is disposed at the front, and displaying selectable elements for designating options "individual print setting", "collective print setting", and "start printing".

In step S223, the receiving unit 303 determines whether or not an operation performed on the compilation-layout display is received. For example, it is determined whether or not any one of the options "individual print setting", "collective print setting", and "start printing" shown in FIG. 13 is selected. If a positive determination result is obtained, the process proceeds to step S225. If a negative determination result is obtained, the process returns to step S200 to repeat the above-described process.

In step S225, the second controller 304 displays the compilation-layout-displayed information in a carousel-layout fashion. The process then returns to step S200 to repeat the above-described process. For example, as shown in FIG. 13, if the option "individual print setting" is selected, the images A to C to be printed are displayed in a carousel-layout fashion together with a selectable element "print setting" and a selectable element "delete". FIG. 13 illustrates an example where the display includes selectable elements that allow options "print setting" and "delete" to be performed on the images A to C to be printed. If the receiving unit 303 receives an operation performed on the selectable element "collective print setting" displayed in a compilation-layout fashion or on the selectable element "print setting" for individual images, the print settings are displayed in a carousel-layout fashion, as shown in the lower right part of FIG. 13. In the example in FIG. 13, the print settings include color, chroma, and density as examples.

As an alternative to the above exemplary embodiments in which the chat room server 20 and the chatbot server 30 are described as being separate apparatuses, for example, the chat room server 20 and the chatbot server 30 may be realized as a single apparatus. As another alternative, one or some of the functions of the chat room server 20 or the chatbot server 30 may be realized by another server.

The process performed in the chatbot server 30 according to each of the above exemplary embodiments may be a process performed by software, a process performed by hardware, or a process performed by a combination of software and hardware. Furthermore, the process performed in the chatbot server 30 may be distributed by being stored as a program in a storage medium.

The program for causing the chatbot server 30 to operate may be provided via a computer-readable storage medium, such as a universal-serial-bus (USB) memory, a flexible disk, or a compact disc read-only memory (CD-ROM), or may be provided online via a network, such as the Internet. In this case, the program stored in the computer-readable storage medium is normally forwarded to and stored in a memory or a storage unit. Moreover, for example, this program may be provided as a single application software program or may be incorporated as one of the functions of the chatbot server 30 in software of each apparatus thereof.

The present disclosure is not limited to the above description, and various modifications are permissible so long as they do not depart from the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control apparatus comprising:
a processor configured to:
receive an instruction to execute a predetermined process corresponding to a post posted on a space provided by a service, the predetermined process being executed on one or more target posts posted on the space, the space presenting posts in a predetermined direction in a chronological order;
execute the predetermined process in response to the instruction;
in a case where the one or more target posts of the predetermined process are posted on the space and a predetermined condition is satisfied, remove at least one post from the space and post an alternative post corresponding to the removed at least one post on the space, the predetermined condition including a plurality of target posts being posted on the space; and remove the plurality of target posts and post a compilation of the removed plurality of target posts as the alternative post.

2. The control apparatus according to claim 1,
wherein the predetermined condition includes a plurality of posts being posted on the space as the one or more target posts of the predetermined process,
wherein the alternative post includes a selectable element which allows a user to instruct execution of the predetermined process on the plurality of posts.

3. The control apparatus according to claim 2,
wherein the predetermined condition includes the plurality of posts and a subsequent post being posted on the space, and
wherein the alternative post includes a selectable element which allows the user to instruct execution of the predetermined process on any post on which the predetermined process has not yet been executed.

4. The control apparatus according to claim 3,
wherein the alternative post includes a plurality of selectable elements including a first selectable element and a second selectable element, the first selectable element allowing the user to instruct execution of the predetermined process on the subsequent post, the second selectable element allowing the user to instruct execution of the predetermined process on any post on which the predetermined process has not yet been executed.

5. The control apparatus according to claim 1,
wherein the predetermined condition includes execution of the predetermined process on a plurality of target posts posted on the space,
wherein the processor is configured to, in response to the predetermined condition, remove the plurality of target posts on which the predetermined process has been executed and posts a history of the execution of the predetermined process as the alternative post.

6. The control apparatus according to claim 5,
wherein the processor is configured to, in response to a user operation on the history, present a carousel of the removed plurality of target posts to a user, the carousel being slidable in a direction intersecting the predetermined direction.

7. The control apparatus according to claim 5,
wherein, before posting the history of the execution of the predetermined process, the processor is configured to present options to a user allowing the user to choose content to be displayed as the history.

8. The control apparatus according to claim 6,
wherein, before posting the history of the execution of the predetermined process, the processor is configured to present options to the user allowing the user to choose content to be displayed as the history.

9. The control apparatus according to claim 1,
wherein the compilation of the plurality of target posts includes a selectable element which allows a user to instruct execution of the predetermined process on the plurality of target posts.

10. A control system comprising:
the control apparatus according to claim 1;
a providing apparatus that provides the service; and
a terminal apparatus that is used by a user to submit posts to the space provided by the service.

11. A control system comprising:
a first processor configured to provide a service displaying a post posted by a user in a predetermined direction in a chronological order and usable for inputting an instruction to execute a predetermined process corresponding to the post; and
a second processor configured to:
receive the instruction to execute the predetermined process corresponding to the post posted on a space provided by the service, the predetermined process being executed on one or more target posts posted on the space, the space presenting posts in the predetermined direction in the chronological order;
execute the predetermined process in response to the instruction;
in a case where the one or more target posts of the predetermined process are posted on the space and a predetermined condition is satisfied, remove at least one post from the space and post an alternative post corresponding to the removed at least one post on the space, the predetermined condition including a plurality of target posts being posted on the space; and
remove the plurality of target posts and post a compilation of the removed plurality of target posts as the alternative post.

12. A non-transitory computer readable medium storing a program causing a computer to execute a control process, the control process comprising:
receiving an instruction to execute a predetermined process corresponding to a post posted on a space provided by a service, the predetermined process being executed on one or more target posts posted on the space, the space presenting posts in a predetermined direction in a chronological order;
performing control to execute the predetermined process in response to the instruction;
removing at least one post from the space and posting an alternative post corresponding to the removed at least one post on the space in a case where the one or more target posts of the predetermined process are posted on the space and a predetermined condition is satisfied, the predetermined condition including a plurality of target posts being posted on the space; and
removing the plurality of target posts and posting a compilation of the removed plurality of target posts as the alternative post.

* * * * *